UNITED STATES PATENT OFFICE.

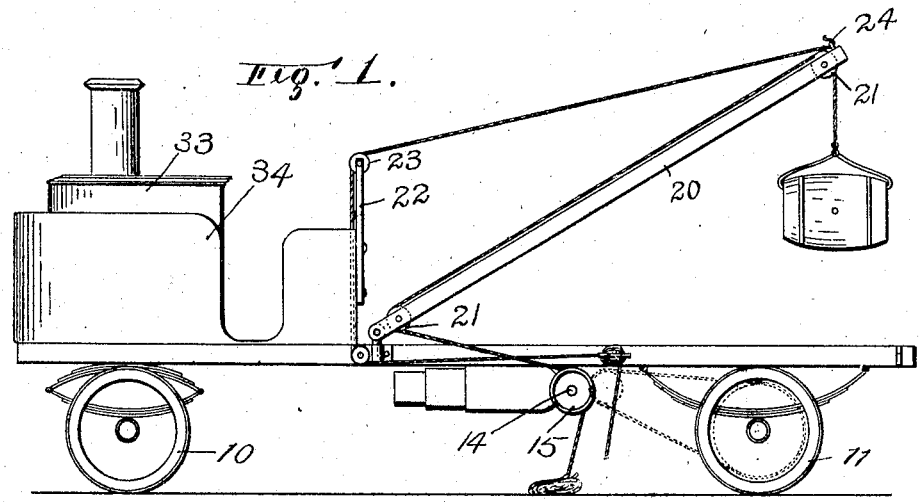
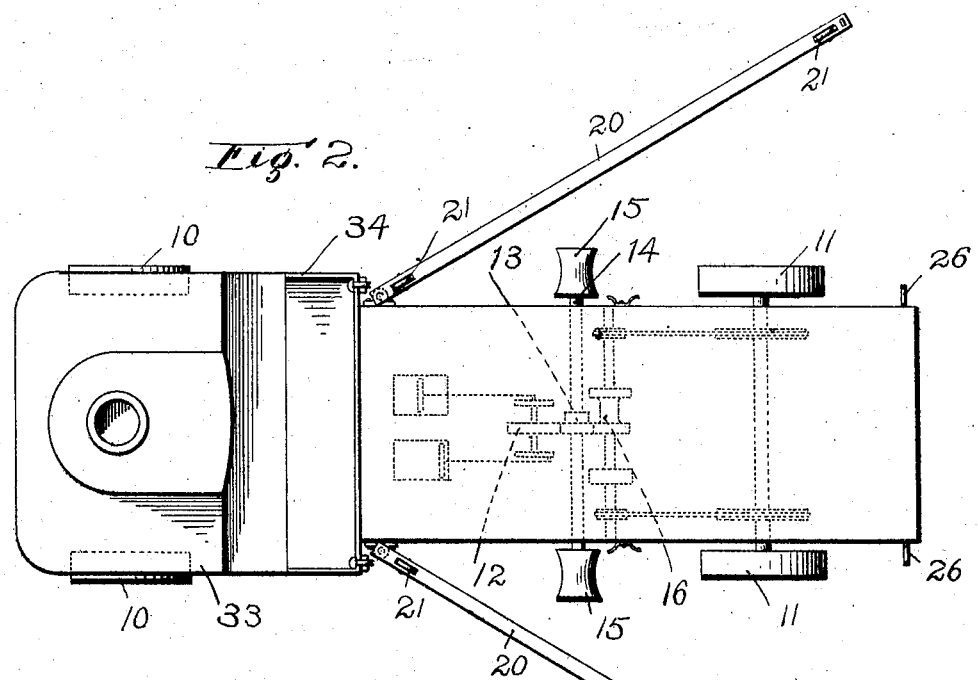
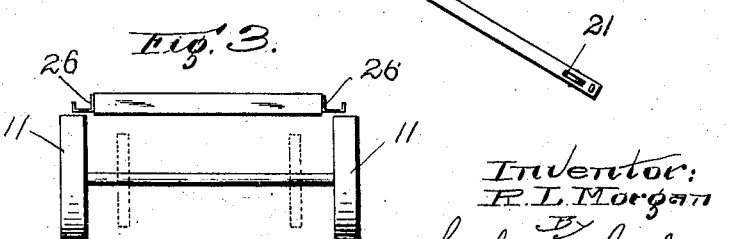

RALPH L. MORGAN, OF WORCESTER, MASSACHUSETTS.

MOTOR-TRUCK.

No. 800,166.  Specification of Letters Patent.  Patented Sept. 26, 1905.

Application filed January 18, 1902. Renewed April 19, 1905. Serial No. 256,410.

*To all whom it may concern:*

Be it known that I, RALPH L. MORGAN, a citizen of the United States, residing at Worcester, in the county of Worcester and State of Massachusetts, have invented a new and useful Motor-Truck, of which the following is a specification.

This invention relates to that class of motor-trucks which are employed for handling freight or packages.

The especial object of this invention is to provide a motor-truck with a loading or unloading apparatus which can be operated by power furnished by the truck itself.

To these ends this invention consists of the motor-truck and of the combination of parts therein, as hereinafter described, and more particularly pointed out in the claim at the end of this specification.

In the accompanying drawings, Figure 1 is a side view of a motor-truck provided with loading and unloading attachments constructed according to this invention. Fig. 2 is a side view of the same, and Fig. 3 is a partial end view showing the brackets or rests in which the jib-cranes may be supported when not in use.

In trucking nearly all classes of freight it is now the custom to load and unload the trucks by hand. This practice is especially objectionable in loading and unloading motor-trucks on account of the time required during which the truck remains stationary, the large cost of a motor-truck, and the expense of skilled engineering help for running the same requiring that for economical operation the truck should be kept moving as much as possible. The especial object of my present invention is therefore to provide a motor-truck with lifting devices or cranes which may be operated from power furnished by the truck itself. To accomplish this result, a motor-truck constructed according to my present invention is preferably provided with a motor or engine which is coupled to the driving-gear of the truck in such way that it may be disconnected therefrom and utilized to operate drums or capstans while the truck remains stationary. Mounted on the truck, preferably one at each side thereof, are jib-cranes which may be elevated or swung to different positions, the lifting-tackle of said cranes being preferably connected to be operated from the capstans or hoisting-drums referred to. When the jib-cranes are not in use, the elevating-tackle may be disconnected and the cranes may be supported in brackets at the sides of the truck, where they will be out of the way.

Referring to the accompanying drawings and in detail, a motor-truck constructed according to my invention as herein illustrated comprises a platform mounted to run on front wheels 10 and rear wheels 11. At the forward end of the platform is the boiler 33 and an engineer's cage 34. The running-gear of the truck is preferably supported beneath the platform and, as illustrated most clearly in Fig. 2, the running-gear comprises a double-cylinder engine having a driving-gear 12 on its main shaft, which driving-gear 12 meshes with and drives a double gear 13, secured on a shaft 14, having drums or capstan-heads 15 at its ends. Meshing with and driven from the double gear 13 is a shifting gear 16, which is longitudinally movable on a shaft which is connected by the usual chains and sprocket-wheels to drive the rear wheels of the truck. When the shiftable gear 16 is in its extreme position in one direction, the smaller section of said shifting gear meshes with the larger section of the double gear 13, and when the shiftable gear 16 is moved to its extreme position in the opposite direction the larger section of said shiftable gear 16 meshes with the smaller section of the double gear 13. By means of this construction a change-speed gearing is provided for propelling the truck at two different relative speeds. When the shiftable gear 16 occupies an intermediate position, the motor or engine of the truck will be uncoupled from the driving-gear.

In a companion application for patent executed by me of even date herewith I have shown a construction of loading-platform having fixtures which are designed to be operated from the capstans of a motor-truck. In this application for patent I do not desire, therefore, to claim, broadly, the construction of a motor-truck having drums or capstans arranged to be operated from the motor or engine of the truck, the especial object of my present invention being to provide the truck itself with lifting or loading attachments as distinguished from the loading-platform or stationary fixtures shown and claimed in my companion case referred to.

As herein illustrated, the loading devices of a truck constructed according to my invention comprise pivoted pieces or posts carrying the pivoted arms or cranes 20. The pivoted arms or cranes 20 are each provided with pulleys 21 for receiving a hoisting-rope, which may be wound upon one of the drums or capstans 15 of the truck. Secured on the engineer's cab or cage are the uprights 22, each having a pulley 23 for an elevating-cord having a hook 24 detachably connected to the end of the jib-crane.

When the cranes are not in use, the elevating-cord can be detached from the end, and the jib-cranes may be supported in brackets 26 in position to be out of the way at each side of the platform of the truck.

I am aware that changes may be made in the construction of my motor-truck by skilled mechanics without departing from the scope of my invention as expressed in the claim. I do not wish, therefore, to be limited to the construction I have herein shown and described; but What I do claim, and desire to secure by Letters Patent of the United States, is—

In an automobile truck, adapted for carrying loads along ordinary streets or highways, the combination of a truck-platform, the wheels supporting said platform, operating connections for the truck located beneath said platform, and comprising an engine, a running-gearing, and a shiftable connection for driving the running-gearing at different speeds, a shaft turning with said engine, and having capstans at its ends at the side of the truck, and a jib-crane pivoted at the side of the truck-platform and arranged to swing over the truck-platform to place loads thereon or remove them therefrom, and arranged to be operated from one of the capstans.

In testimony whereof I have hereunto set my hand in the presence of two subscribing witnesses.

R. L. MORGAN.

Witnesses:
JOHN F. CROWELL,
PHILIP W. SOUTHGATE.